US012726834B2

(12) United States Patent
Sakhnini et al.

(10) Patent No.: US 12,726,834 B2
(45) Date of Patent: Sep. 1, 2026

(54) IMPLICIT WAVEFORM SWITCHING

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 515 days.

(21) Appl. No.: 17/645,362

(22) Filed: Dec. 21, 2021

(65) Prior Publication Data

US 2023/0199520 A1 Jun. 22, 2023

(51) Int. Cl.
*H04W 4/00* (2018.01)
*H04W 24/02* (2009.01)
*H04W 72/04* (2023.01)

(52) U.S. Cl.
CPC ........... *H04W 24/02* (2013.01); *H04W 72/04* (2013.01)

(58) Field of Classification Search
CPC ........... H04J 2203/0069; H04W 72/04; H04W 72/50; H04W 24/02
See application file for complete search history.

(56) References Cited

U.S. PATENT DOCUMENTS

2018/0035423 A1* 2/2018 Wang .................... H04L 5/0007
2018/0092086 A1* 3/2018 Nammi ............. H04L 27/26025
2019/0182812 A1* 6/2019 Shimezawa ............. H04L 5/001
2019/0372813 A1* 12/2019 Moroga ............ H04L 27/26526
2020/0120642 A1* 4/2020 Hwang ................... H04L 5/005
2020/0296736 A1* 9/2020 Yokomakura ......... H04W 72/12
2021/0194654 A1* 6/2021 Zhang ................... H04L 5/0091
2022/0376965 A1* 11/2022 Ramirez-Gutierrez ...................... H04W 72/23
2023/0283436 A1* 9/2023 Bhamri .............. H04W 72/232 370/329
2023/0337200 A1* 10/2023 Ali .................... H04W 74/0833

FOREIGN PATENT DOCUMENTS

WO WO-2021047973 A1 3/2021

OTHER PUBLICATIONS

International Search Report and Written Opinion—PCT/US2022/079833—ISA/EPO—Mar. 13, 2023.
Vivo et al., "Rel-17 TEI Proposals", 3GPP TSG RAN WG1 #106bis-e, R1-2109024, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 1, 2021, XP052057985, 5 pages, p. 3, paragraph 1 p. 4, paragraph 2.

* cited by examiner

*Primary Examiner* — Shantell L Heiber
(74) *Attorney, Agent, or Firm* — Harrity & Harrity, LLP

(57) ABSTRACT

Various aspects of the present disclosure generally relate to wireless communication. In some aspects, a user equipment (UE) may obtain an indication to switch from a first waveform to a second waveform based at least in part on a condition. The UE may communicate with a base station using the second waveform. Numerous other aspects are described.

30 Claims, 9 Drawing Sheets

IMPLICIT WAVEFORM SWITCHING

FIELD OF THE DISCLOSURE

Aspects of the present disclosure generally relate to wireless communication and to techniques and apparatuses for implicit waveform switching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include obtaining an indication to switch from a first waveform to a second waveform based at least in part on a condition. The method may include communicating with a base station using the second waveform.

Some aspects described herein relate to a method of wireless communication performed by a base station. The method may include obtaining an indication to switch from a first waveform to a second waveform based at least in part on a condition. The method may include communicating with a UE using the second waveform.

Some aspects described herein relate to an apparatus for wireless communication performed by a UE. The apparatus may include a memory and one or more processors, coupled to the memory. The one or more processors may be configured to obtain an indication to switch from a first waveform to a second waveform based at least in part on a condition. The one or more processors may be configured to communicate with a base station using the second waveform.

Some aspects described herein relate to an apparatus for wireless communication performed by a base station. The apparatus may include a memory and one or more processors, coupled to the memory. The one or more processors may be configured to obtain an indication to switch from a first waveform to a second waveform based at least in part on a condition. The one or more processors may be configured to communicating with a UE using the second waveform.

Some aspects described herein relate to a non-transitory computer-readable medium that stores a set of instructions for wireless communication by a UE. The set of instructions, when executed by one or more processors of the UE, may cause the UE to obtain an indication to switch from a first waveform to a second waveform based at least in part on a condition. The set of instructions, when executed by one or more processors of the UE, may cause the UE to communicate with a base station using the second waveform.

Some aspects described herein relate to a non-transitory computer-readable medium that stores a set of instructions for wireless communication by a base station. The set of instructions, when executed by one or more processors of the base station, may cause the base station to obtain an indication to switch from a first waveform to a second waveform based at least in part on a condition. The set of instructions, when executed by one or more processors of the base station, may cause the base station to communicate with a UE using the second waveform.

Some aspects described herein relate to an apparatus for wireless communication. The apparatus may include means for obtaining an indication to switch from a first waveform to a second waveform based at least in part on a condition. The apparatus may include means for communicating with a base station using the second waveform.

Some aspects described herein relate to an apparatus for wireless communication. The apparatus may include means for obtaining an indication to switch from a first waveform to a second waveform based at least in part on a condition. The apparatus may include means for communicating with a UE using the second waveform.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
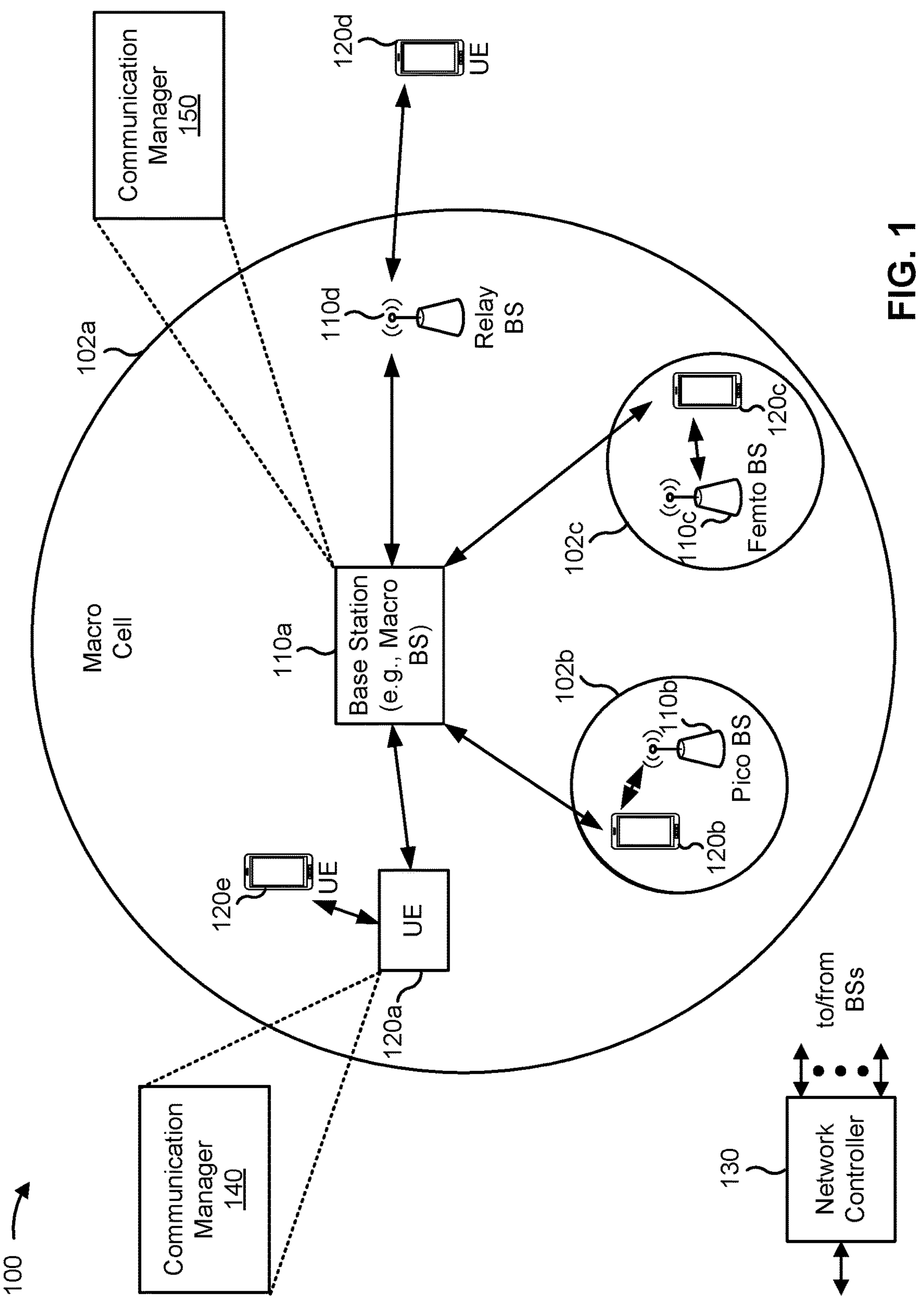
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4*a* or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-*a* or FR4-1, and/or FR5, or may be within the EHF band. It is contemplated that the frequencies included in these operating bands (e.g., FR1, FR2, FR3, FR4, FR4-*a*, FR4-1, and/or FR5) may be modified, and techniques described herein are applicable to those modified frequency ranges.

In some aspects, the UE 120 may include a communication manager 140. As described in more detail elsewhere herein, the communication manager 140 may obtain an indication to switch from a first waveform to a second waveform based at least in part on a condition; and communicate with a base station using the second waveform. Additionally, or alternatively, the communication manager 140 may perform one or more other operations described herein.

In some aspects, the base station 110 may include a communication manager 150. As described in more detail elsewhere herein, the communication manager 150 may obtain an indication to switch from a first waveform to a second waveform based at least in part on a condition; and communicate with a UE using the second waveform. Additionally, or alternatively, the communication manager 150 may perform one or more other operations described herein.

As indicated above, FIG. 1 is provided as an example. Other examples may differ from what is described with regard to FIG. 1.

Figure 2:
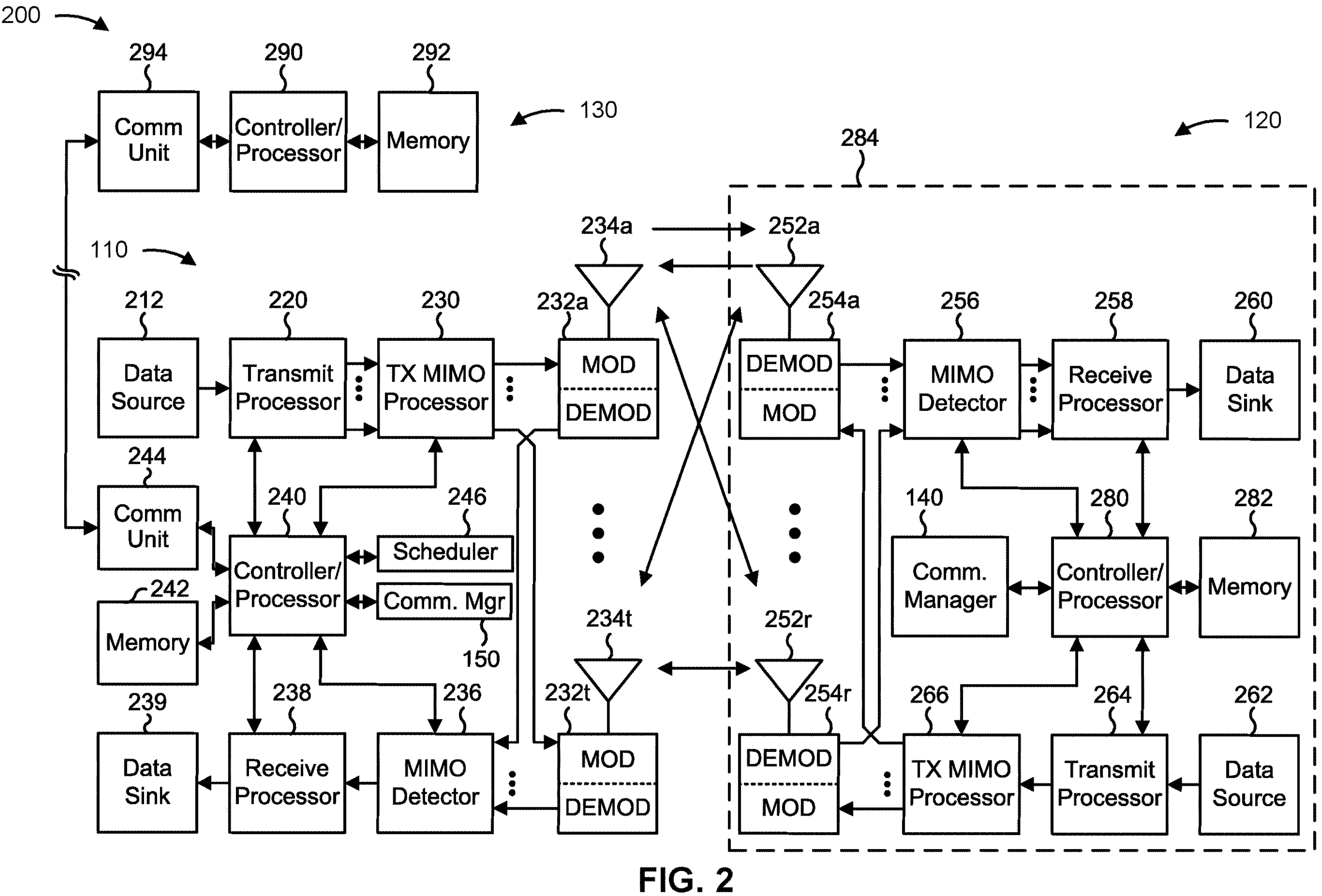
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T>1). The UE 120 may be equipped with a set of antennas 252*a* through 252*r*, such as R antennas (R>1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with implicit waveform switching, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE includes means for obtaining an indication to switch from a first waveform to a second waveform based at least in part on a condition; and/or means for communicating with a base station using the second waveform. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for obtaining an indication to switch from a first waveform to a second waveform based at least in part on a condition; and/or means for communicating with a UE using the second waveform. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
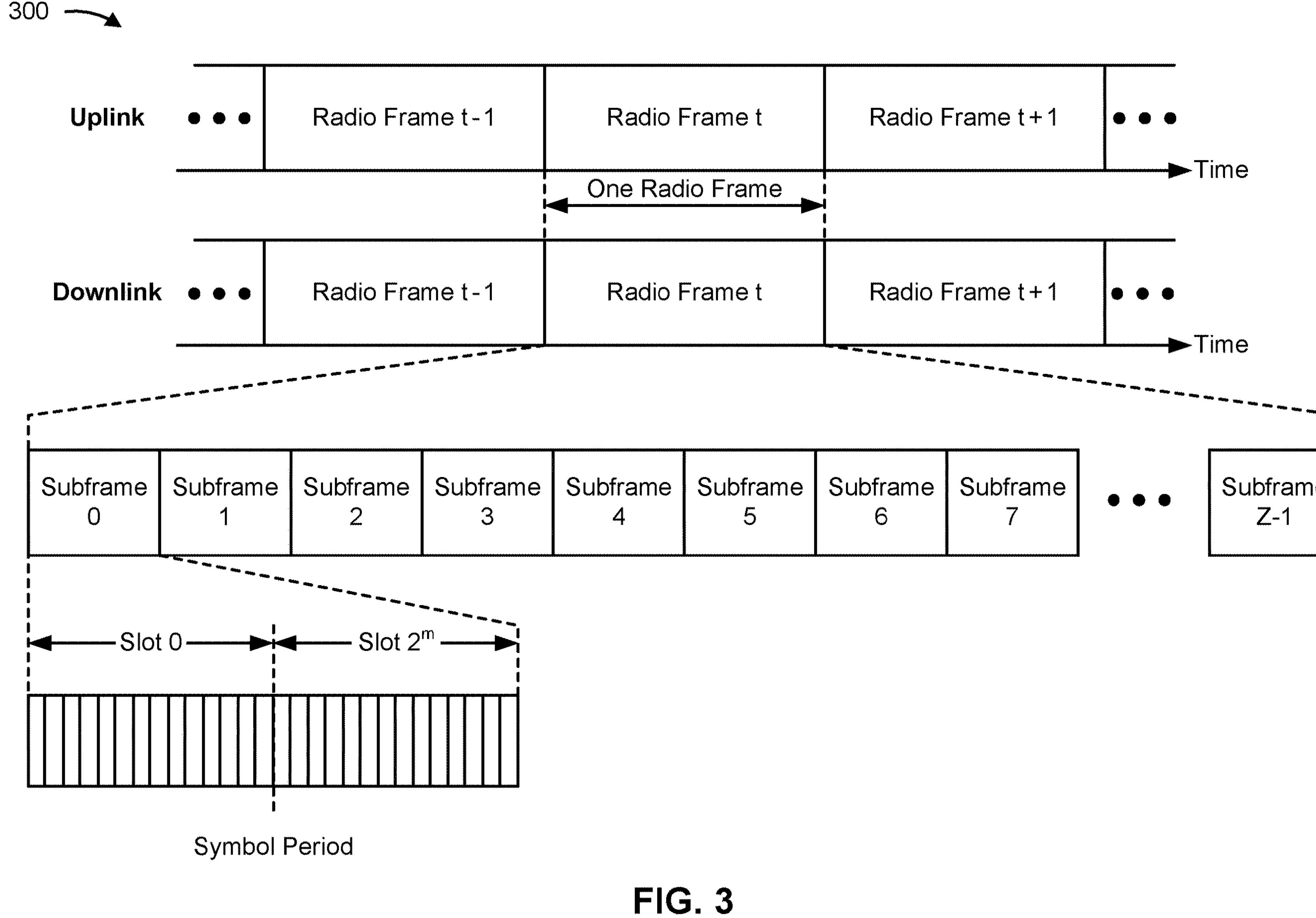
FIG. 3 is a diagram illustrating an example of a frame structure in a wireless communication, in accordance with the present disclosure.

FIG. 3 is a diagram illustrating an example 300 of a frame structure in a wireless communication network, in accordance with the present disclosure. The frame structure shown in FIG. 3 is for frequency division duplexing (FDD) in a telecommunication system, such as LTE or NR. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z>1) subframes (e.g., with indices of 0 through Z-1). Each subframe may have a predetermined duration (e.g., 1 ms) and may include a set of slots (e.g., 2 m slots per subframe are shown in FIG. 3, where m is an index of a numerology used for a transmission, such as 0, 1, 2, 3, 4, or another number). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L-1. In some aspects, a scheduling unit for the FDD may be frame-based, subframe-based, slot-based, mini-slot based, or symbol-based.

As described in more detail below, the UE 120 may be configured to transmit one or more frames of a communication using a first waveform. The UE 120 may switch from the first waveform to a second waveform based at least in part on an occurrence of one or more conditions.

As indicated above, FIG. 3 is provided as an example. Other examples may differ from what is described with respect to FIG. 3.

Figure 4:
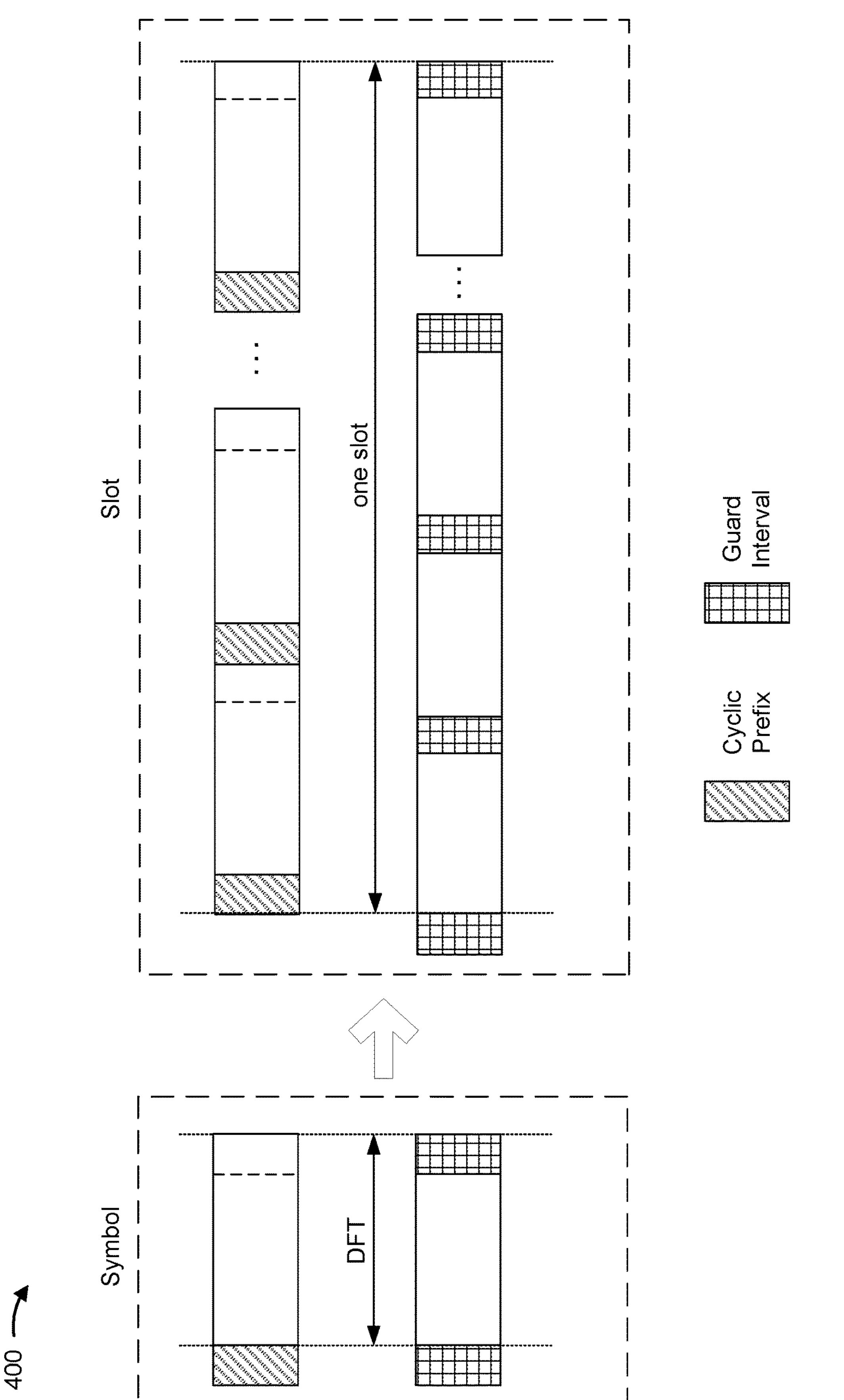
FIG. 4 is a diagram illustrating an example of guard intervals and cyclic prefixes, in accordance with the present disclosure.

FIG. 4 is a diagram illustrating an example 400 of guard intervals and cyclic prefixes, in accordance with the present disclosure.

In some cases, a symbol may include a guard interval. The guard interval may be used to prevent inter-symbol interference. For example, the guard interval may be used to ensure that a transmission from one device does not interfere with a transmission from another device (e.g., as in time division multiple access (TDMA)), or with a transmission from the same device (e.g., as in orthogonal frequency division multiplexing (OFDM)). The guard interval may be a sequence that is known to both the transmitter device and the receiver device.

In some cases, a symbol may include a cyclic prefix. The cyclic prefix may be used to prevent inter-symbol interference. The cyclic prefix may include an end portion of the symbol that is copied and inserted into a beginning portion of the symbol (e.g., before a start time of the symbol). The cyclic prefix may include data, such as data that is intended to be used by the receiver device.

As described above, the guard interval and the cyclic prefix may be used to prevent inter-symbol interference. In some cases, the guard interval and the cyclic prefix may be used to convert a linear convolution of a transmitted symbol to a circular convolution of the symbol (e.g., using single tap frequency domain equalization at the receiver). In some cases, the guard interval and the cyclic prefix may be used to maintain symbol alignment and/or slot alignment. However, there may be a number of differences between the guard interval and the cyclic prefix. Some example differences are described below.

In some cases, the guard interval may be included in the discrete Fourier transform (DFT) for the symbol. In contrast, the cyclic prefix may be outside of the DFT for the symbol.

In some cases, the guard interval may have a uniform length. For example, the guard interval may include fifteen symbols per slot. In contrast, the cyclic prefixes may have different lengths. For example, a normal cyclic prefix (NCP) may include fourteen OFDM symbols per slot, whereas an extended cyclic prefix may include twelve OFDM symbols per slot.

In some cases, the guard interval may include a sequence that is known to both the transmitter and the receiver. Thus, the guard interval may be the same for each symbol. In contrast, the cyclic prefix may be copied form the end portion of each individual symbol. Thus, the cyclic prefix may be different for each symbol.

In some cases, the guard interval may be used for synchronization, channel estimation, and/or phase tracking. In contrast, the cyclic prefix cannot be used for these purposes (e.g., since the cyclic prefix contains actual data).

In some cases, the guard interval may be adaptable to a delay spread, without changing the duration of the symbols. The delay spread may be the difference between the time of arrival of the earliest significant multipath component and the time of arrival of the last significant multipath component. In contrast, the cyclic prefix is not easily adaptable to the delay spread.

As described above, the guard interval or the cyclic prefix may be used to prevent inter-symbol interference between two communications. In some cases, it may be desirable to use higher operating bands (e.g., 100 GHz operating bands) for performing the communications. For example, higher operating bands may enable the communication of a higher amount of data. However, communicating using the higher operating bands may result in an increased phase noise (PN) of the communication, a lower peak-to-average-power ratio (PAPR) of the communication, and/or an increase in the UE complexity requirements. In some cases, certain waveforms may be used to improve these conditions.

In some cases, a CP-OFDM waveform may be used for performing the communication. In this example, a modulation symbol (e.g., a quadrature amplitude modulation (QAM) symbol) may be mapped to the time domain using an inverse fast Fourier transform (IFFT), and a cyclic prefix may be added to the time domain symbol. The symbol may be transmitted in the time domain with the cyclic prefix. Some characteristics of the CP-OFDM waveform may include higher UE complexity, single tap frequency domain equalization (FDE), efficient bandwidth utilization, simple frequency division multiplexing (FDM), increased subcarrier spacing (SCS), and enablement of higher order MIMO communications.

In some cases, a single carrier frequency domain (e g , a DFT-s-OFDM) waveform may be used for performing the communication. In this example, time domain modulation symbols may be mapped to the frequency domain using a DFT operation. The output of the DFT operation may be mapped to one or more tones. The one or more tones may be mapped to the time domain using an IFFT operation. The DFT-s-OFDM waveform may allow for an oversampling of the communication. The DFT-s-OFDM waveform may use a guard interval or a cyclic prefix. Some characteristics of the DFT-s-OFDM waveform include higher UE complexity, single tap FDE, efficient bandwidth utilization, FDM with PAPR impact, and increased SCS.

In some cases, a single carrier time domain implementation (e.g., an SC-FDE/QAM) waveform may be used for performing the communication. In this example, the tones may be oversampled without the use of the DFT and the IFFT operations. The SC-FDE/QAM waveform may use a guard interval or a cyclic prefix. Some characteristics of the SC-FDE/QAM waveform may include lower UE complexity, single tap FDE or time domain equalization (TDE), FDM with guard bands, low signal to noise ratio (SNR), and low PAPR (e.g., as a result of time domain filtering).

As described above, these waveforms are provided for the purposes of example only. The waveforms are not limited to the examples above. Additional, or alternative, waveforms may be considered for reducing phase noise, enabling higher PAPR, or reducing UE complexity, among other examples.

In some cases, the UE 120 may be communicating with the base station 110 using a first waveform. However, one or more conditions may occur that make the first waveform less desirable and/or that make other waveforms more desirable. For example, during a first time period, the UE 120 may be at a first location that is close to the cell edge. The UE 120 may be communicating with the base station 110 using a single carrier waveform, such as a DFT-s-OFDM waveform. The UE 120 may have a low SNR and may not need to perform MIMO communications. During a second time period, the UE 120 may move to a second location that is closer to the base station 110. The UE 120 may determine to communicate with the base station 110 using MIMO. However, the DFT-s-OFDM waveform may not support MIMO communications, particularly higher order MIMO communications. Thus, the UE 120 may not be able to communicate with the base station 110 using MIMO, even though the channel conditions may support MIMO communications. In order to switch from a waveform that does not permit MIMO, such as the DFT-s-OFDM waveform, to a waveform that does permit MIMO, such as the CP-OFDM waveform, the UE 120 may need to receive instructions from the base station 110. Thus, signaling overhead may be increased, and network bandwidth may be burdened.

Techniques and apparatuses are described herein for implicit waveform switching. For example, a UE may be configured to obtain an indication to switch from a first waveform to a second waveform based at least in part on a condition. In some aspects, the UE may determine to switch from the first waveform to the second waveform based at least in part on an occurrence of the condition. In some aspects, the base station may detect the occurrence of the condition, and may transmit a request for the UE to switch from the first waveform to the second waveform. The UE may communicate with the base station using the second waveform.

As described above, the UE and the base station may communicate using a first waveform. However, it may be desirable for the UE and the base station to communicate using a second waveform. In order to switch from the first waveform to the second waveform, the UE may need to transmit a request to the base station, and receive a response from the base station, indicating that the UE can switch from the first waveform to the second waveform. This results in increased signaling overhead, and unnecessary bandwidth usage. Using the techniques and apparatuses described herein, the UE may be configured to switch from the first waveform to the second waveform based at least in part on an occurrence of the condition, without transmitting a request to the base station. Alternatively, the base station may detect the occurrence of the condition, and may request for the UE to switch from the first waveform to the second waveform, without receiving an initial request from the UE. Thus, signaling overhead may be reduced.

As indicated above, FIG. 4 is provided as an example. Other examples may differ from what is described with respect to FIG. 4.

Figure 5:
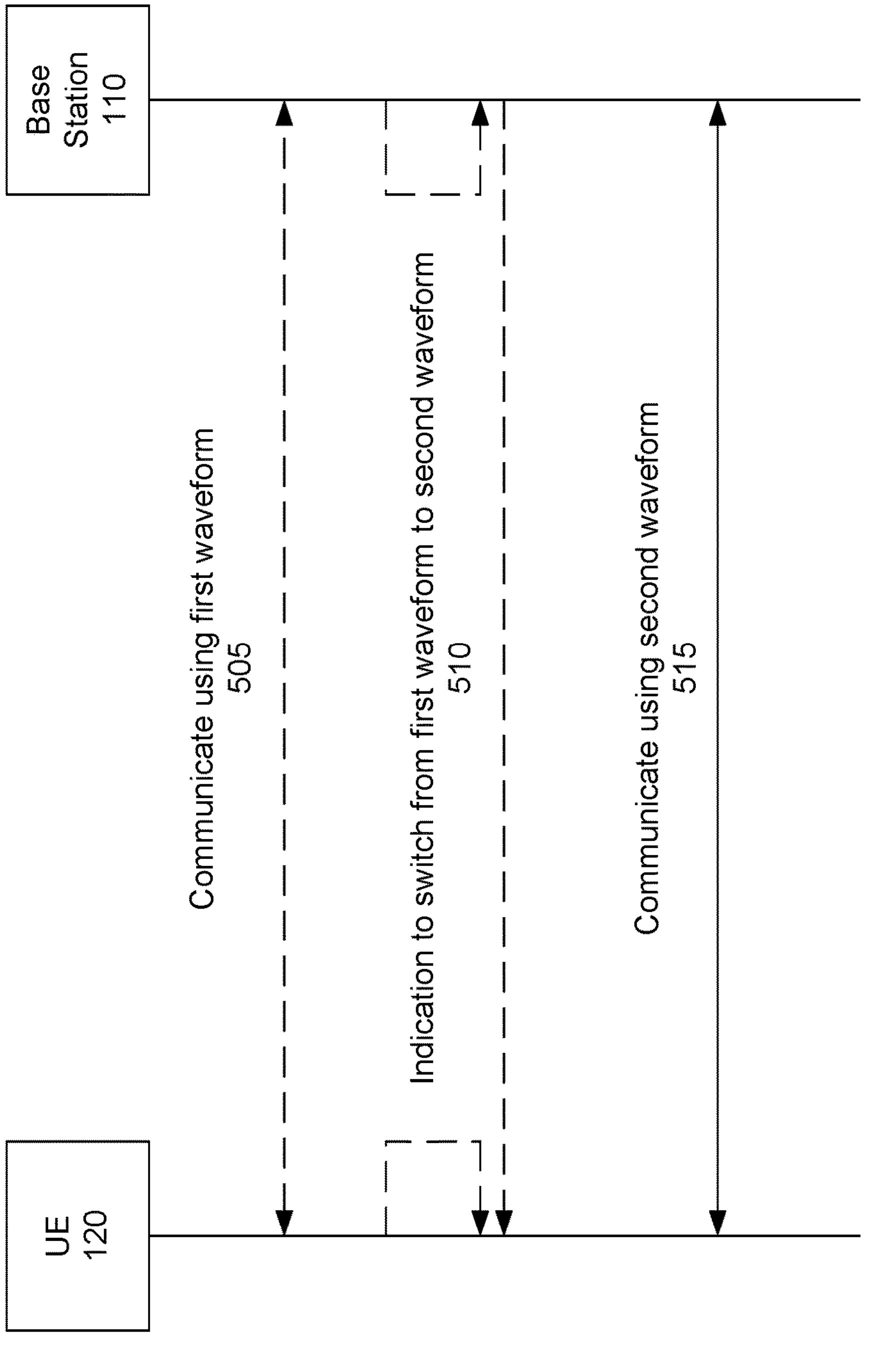
FIG. 5 is a diagram illustrating an example associated with implicit waveform switching, in accordance with the present disclosure.

FIG. 5 is a diagram illustrating an example 500 of implicit waveform switching, in accordance with the present disclosure. A UE, such as the UE 120, may communicate with a base station, such as the base station 110.

As shown in connection with reference number 505, the UE 120 may communicate with the base station 110 using a first waveform. As described above in connection with the example 400, the UE 120 may communicate with the base station 110 using the CP-OFDM waveform, the DFT-s-OFDM waveform, or the SC-FDE/QAM waveform, among other examples. In some aspects, the UE 120 and the base station 110 may communicate in a higher operating band, such as the 100 GHz operating band.

As shown in connection with reference number 510, the UE 120 and/or the base station 110 may obtain an indication to switch from the first waveform to the second waveform. The switch from the first waveform to the second waveform may be based at least in part on one or more conditions. In some aspects, the indication to switch from the first waveform to the second waveform may be obtained based at least in part on an occurrence of a condition, or multiple conditions, of the one or more conditions. Switching from the first waveform to the second waveform may include switching to another of the CP-OFDM waveform, the DFT-s-OFDM waveform, or the SC-FDE/QAM waveform, among other examples.

In some aspects, the UE 120 may obtain the indication to switch from the first waveform to the second waveform. In some aspects, the UE 120 may determine to switch from the first waveform to the second waveform based at least in part on an occurrence of the condition. For example, the UE 120 may detect an occurrence of the condition and may determine to switch from the first waveform to the second waveform. In some aspects, the UE 120 may obtain the indication to switch from the first waveform to the second waveform from the base station 110. For example, the base station 110 may detect the occurrence of the condition, and the base station 110 may transmit, and the UE 120 may receive, a request for the UE 120 to switch from the first waveform to the second waveform.

In some aspects, the base station 110 may obtain the indication to switch from the first waveform to the second waveform. In some aspects, the base station 110 may determine to switch from the first waveform to the second waveform based at least in part on an occurrence of the condition. For example, the base station 110 may detect an occurrence of the condition and may determine to switch from the first waveform to the second waveform. In some aspects, the base station 110 may obtain the indication to switch from the first waveform to the second waveform from the UE 120. For example, the UE 120 may detect the occurrence of the condition, and the UE 120 may transmit, and the base station 110 may receive, a request for the base station 110 to switch from the first waveform to the second waveform.

In some aspects, the condition may be based at least in part on channel state information (CSI), such as a CQI, or a rank indicator (RI), of the communication. For example, if the RI is less than one, or less than or equal to one, the UE 120 and the base station 110 may communicate using a first waveform that does not use OFDM. In contrast, if the RI is greater than one, or greater than or equal to one, the UE 120 and the base station 110 may communicate using a second waveform that supports OFDM. Thus, the UE 120 and the base station 110 may switch from the first waveform to the second waveform based at least in part on an occurrence of the RI changing from a value that is less than one, to a value that is greater than one.

In some aspects, the condition may be based at least in part on an SNR or an MCS of the communication. For example, if the MCS is less than a threshold, or less than or equal to the threshold, the UE 120 and the base station 110 may communicate using a single carrier FDE waveform. In contrast, if the MCS is greater than the threshold, or greater than or equal to the threshold, the UE 120 and the base station 110 may communicate using an OFDM waveform. Thus, the UE 120 and the base station 110 may switch from the first waveform to the second waveform based at least in part on an occurrence of the MCS chancing from a value that is below the threshold to a value that is above the threshold.

In some aspects, the condition may be based at least in part on a transmission configuration indicator (TCI). For example, during a first time period, the UE 120 and the base station may communicate on a first beam, using a first waveform, that is configured for single users. During a second time period, the UE 120 and the base station 110 may switch to a second beam that is configured for multiple users or that supports OFDM communications. Thus, the UE 120 and the base station 110 may switch from the first waveform to the second waveform based at least in part on an occurrence of the UE 120 and the base station 110 changing from a beam that does not support OFDM to a beam that supports OFDM.

In some aspects, the condition may be based at least in part on an available bandwidth. For example, during a first time period, the UE 120 and the base station 110 may communicate at a higher bandwidth using a single carrier waveform. During a second time period, when bandwidth is lower, the UE 120 and the base station 110 may communicate using an OFDM waveform. Thus, the UE 120 and the base station 110 may switch from the first waveform to the second waveform based at least in part on an occurrence of the bandwidth changing from a higher bandwidth to a lower bandwidth.

In some aspects, the condition may be based at least in part on the channel. For example, physical uplink control channel (PUCCH) communications may use a first waveform, whereas physical uplink shared channel (PUSCH) communications may use a second waveform. Thus, the UE 120 and the base station 110 may switch from the first waveform to the second waveform based at least in part on the communication using the PUCCH or the PUSCH.

In some aspects, the switch from the first waveform to the second waveform may be based at least in part on a transmit power requirement, an FDM requirement, or a MIMO requirement, among other examples. For example, the UE 120 may be close to the cell edge, and communications with the UE 120 may have low SNR, may be power limited, and may not need MIMO. Thus, the UE 120 may switch to a waveform, such as a single carrier waveform, that is compatible these characteristics. In another example, the UE 120 may not be power limited, and may be able to perform MIMO communications. Thus, the UE 120 may switch to a waveform, such as an OFDM waveform, that is compatible with these characteristics.

As described above, the above conditions are provided for the purposes of example only. The conditions are not limited to the examples above. Additional, or alternative, conditions may be considered for switching from the first waveform to the second waveform. In some aspects, a plurality of conditions may be linked, and the UE 120 or the base station 110 may be configured to switch from the first waveform to the second waveform based at least in part on an occurrence of the plurality of conditions.

In some aspects, the one or more conditions may be configured in the UE 120. For example, the UE 120 may be configured (e.g., pre-configured) with the one or more conditions for waveform switching. In some aspects, the UE 120 may receive a configuration that includes the one or more conditions for waveform switching. For example, the base station 110 may transmit, and the UE 120 may receive, a radio resource control (RRC) configuration that includes the one or more conditions for waveform switching. In some aspects, the base station 110 may transmit, and the UE 120 may receive, the one or more conditions for waveform switching. For example, the base station 110 may transmit downlink control information (DCI) that includes the one or more conditions for waveform switching. In some aspects, the UE 120 may transmit, and the base station 110 may receive, the one or more conditions for waveform switching. For example, the UE 120 may transmit uplink control information (UCI) that includes the one or more conditions for waveform switching.

In some aspects, the UE 120 and the base station 110 may switch to the second waveform for all communications, or for a portion of the communications, between the UE 120 and the base station 110. The UE 120 and the base station 110 may determine to switch to the second waveform for all communications, or for a portion of the communications, based at least in part on the particular condition and/or based at least in part on information stored at the UE 120 or the base station 110. In some aspects, the UE 120 and the base station 110 may use the second waveform for communicating all symbols of the communication. In some aspects, the UE 120 and the base station 110 may perform one or more communications using the second waveform in accordance with a pattern. For example, the PDDCH may be periodic according to an SC waveform, and/or the PDSCH may be periodic according to an OFDM pattern. In some aspects, the UE 120 and the base station 110 may communicate using the second waveform for a time period. For example, the UE 120 and the base station 110 may switch to the second waveform for the time period (e.g., ten seconds), and then may switch back to the first waveform, or may switch to another waveform, in accordance with the one or more conditions or the information stored at the UE 120 or the base station 110.

In some aspects, the UE 120 may transmit, and the base station 110 may receive, information associated with the one or more waveforms, or information associated with the one or more conditions. In some aspects, the UE 120 may transmit information (e.g., a recommendation) for selecting a waveform based at least in part on the occurrence of a condition. For example, the UE 120 may transmit a recommendation that indicates to use the first waveform (e.g., an OFDM waveform) based at least in part on an occurrence of a first condition (e.g., a detection of low bandwidth), or to use a second waveform (e.g., a single carrier waveform) based at least in part on an occurrence of a second condition (e.g., a detection of high bandwidth). In some aspects, the recommendation may be applied for a particular panel of the base station 110. In some aspects, the recommendation may be applied for a group of panels of the base station 110.

In some aspects, the UE 120 and/or the base station 110 may wait for a time period, after the occurrence of the condition, before switching from the first waveform to the second waveform. In some aspects, the time period may be based at least in part on a capability of the UE 120, such as a time period required for the UE 120 to perform waveform switching. For example, the UE 120 and the base station 110 may wait for a first time period, for switching from the first waveform to the second waveform, if the UE 120 has a first capability, and may wait a second time period, for switching from the first waveform to the second waveform, if the UE 120 has a second capability (or does not have the first capability).

In some aspects, the time period may be based at least in part on the condition. The condition may indicate the time period for switching from the first waveform to the second waveform. For example, the UE 120 and the base station 110 may wait for a first time period, for switching from the first waveform to the second waveform, based at least in part on an occurrence of a first condition, and may wait for a second time period, for switching from the first waveform to the second waveform, based at least in part on an occurrence of a second condition.

In some aspects, the time period may be based at least in part on a configuration. The configuration of the UE 120, or the configuration of the base station 110, may indicate the time period for switching from the first waveform to the second waveform. For example, the UE 120 and the base station 110 may wait for a first time period, for switching from the first waveform to the second waveform, based at least in part on a first configuration, and may wait for a second time period, for switching from the first waveform to the second waveform, based at least in part on a second configuration.

In some aspects, the time period may be indicated in a transmission from the UE 120 to the base station 110, or in a transmission from the base station 110 to the UE 120. For example, the UE 120 may transmit, and the base station 110 may receive, an indication to wait for the time period, after the occurrence of the condition, for switching from the first waveform to the second waveform. Additionally, or alternatively, the base station 110 may transmit, and the UE 120 may receive, an indication to wait for the time period, after the occurrence of the condition, for switching from the first waveform to the second waveform.

In some aspects, a waveform, such as the second waveform, may have multiple configurations. For example, the second waveform (e.g., a CP-OFDM waveform) may include a bandwidth part (BWP) configuration, a bandwidth configuration, and a reference signal (RS) configuration. The indication to switch from the first waveform to the second waveform may indicate which configuration, of the plurality of comigrations, of the second waveform to activate. For example, the indication to switch from the first waveform to the second waveform may indicate to switch to the BWP configuration of the second waveform.

As shown in connection with reference number 515, the UE 120 and the base station 110 may communicate using the second waveform. The UE 120 may be configured to switch from the first waveform to the second waveform based at least in part on the occurrence of the condition. Additionally, or alternatively, the base station 110 may be configured to switch from the first waveform to the second waveform based at least in part on the occurrence of the condition. The UE 120 and the base station 110 may communicate, using the second waveform, after the UE 120 and the base station 110 have switched from the first waveform to the second waveform.

In some aspects, the UE 120 and the base station 110 may switch from the first waveform to the second waveform after the time period. As described above, the UE 120 and the base station 110 may wait for the time period, after an occurrence of the condition, before switching from the first waveform to the second waveform. The time period may be based at least in part on the condition, the configuration, and/or an indication between the UE 120 and the base station 110.

In some aspects, the UE 120 may transmit, and the base station 110 may receive, a confirmation that the UE 120 has switched from the first waveform to the second waveform. For example, the UE 120 may transmit a confirmation indication, to the base station 110, via the PUCCH, that the UE 120 has switched from the first waveform to the second waveform. In some aspects, the base station 110 may switch from the first waveform to the second waveform prior to receiving the confirmation. In some aspects, if the base station 110 does not receive the conformation from the UE 120 within a duration, the base station 110 may switch back to the first waveform for communicating with the UE 120. For example, the base station 110 may determine, based at least in part on not receiving the confirmation, that the UE 120 did not switch to the second waveform, and therefore is still communicating using the first waveform. In some aspects, the base station 110 may not switch to the second waveform until the base station 110 has received the confirmation from the UE 120.

As described above, the UE 120 and the base station 110 may communicate using the first waveform. However, it may be desirable for the UE 120 and the base station 110 to communicate using the second waveform. In order to switch from the first waveform to the second waveform, the UE 120 may need to transmit a request to the base station 110, and receive a response from the base station 110, indicating that the UE 120 can switch from the first waveform to the second waveform. This results in increased signaling overhead, and unnecessary bandwidth usage. Using the techniques and apparatuses described herein, the UE 120 may be configured to switch from the first waveform to the second waveform based at least in part on an occurrence of the condition, without transmitting a request to the base station 110. Alternatively, the base station 110 may detect the occurrence of the condition, and may request for the UE 120 to switch from the first waveform to the second waveform, without receiving an initial request from the UE 120. Thus, signaling overhead may be reduced.

As indicated above, FIG. 5 is provided as an example. Other examples may differ from what is described with respect to FIG. 5.

Figure 6:
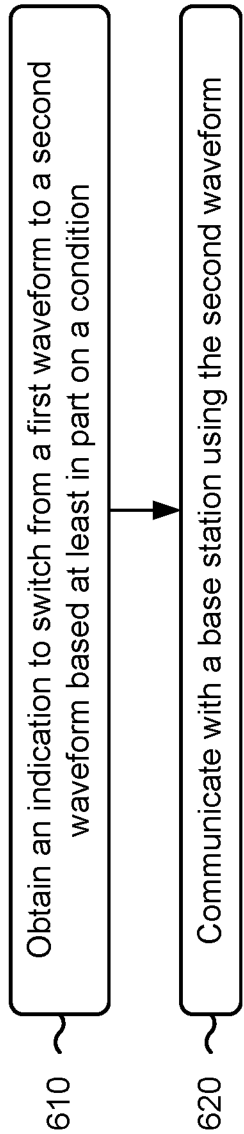
FIG. 6 is a diagram illustrating an example process associated with implicit waveform switching, in accordance with the present disclosure.

FIG. 6 is a diagram illustrating an example process 600 performed, for example, by a UE, in accordance with the present disclosure. Example process 600 is an example where the UE (e.g., UE 120) performs operations associated with implicit waveform switching.

As shown in FIG. 6, in some aspects, process 600 may include obtaining an indication to switch from a first waveform to a second waveform based at least in part on a condition (block 610). For example, the UE (e.g., using communication manager 140 and/or switching component 808, depicted in FIG. 8) may obtain an indication to switch from a first waveform to a second waveform based at least in part on a condition, as described above.

As further shown in FIG. 6, in some aspects, process 600 may include communicating with a base station using the second waveform (block 620). For example, the UE (e.g., using communication manager 140, reception component 802, and/or transmission component 804, depicted in FIG. 8) may communicate with a base station using the second waveform, as described above.

Process 600 may include additional aspects, such as any single aspect or any combination of aspects described below and/or in connection with one or more other processes described elsewhere herein.

In a first aspect, obtaining the indication to switch from the first waveform to the second waveform comprises determining, based at least in part on an occurrence of the condition, to switch from the first waveform to the second waveform.

In a second aspect, alone or in combination with the first aspect, obtaining the indication to switch from the first waveform to the second waveform comprises receiving, from the base station, based at least in part on an occurrence of the condition, a request for the UE to switch from the first waveform to the second waveform.

In a third aspect, alone or in combination with one or more of the first and second aspects, process 600 includes obtaining, from a configuration of the UE, one or more conditions, including the condition, for switching from the first waveform to the second waveform.

In a fourth aspect, alone or in combination with one or more of the first through third aspects, process 600 includes receiving, from the base station, one or more conditions, including the condition, for switching from the first waveform to the second waveform.

In a fifth aspect, alone or in combination with one or more of the first through fourth aspects, the indication to switch from the first waveform to the second waveform indicates to use the second waveform for all symbols after an occurrence of the condition, in accordance with a pattern, for a time period, or some combination thereof.

In a sixth aspect, alone or in combination with one or more of the first through fifth aspects, process 600 includes transmitting, to the base station, information associated with the first waveform or the second waveform, or information associated with the condition.

In a seventh aspect, alone or in combination with one or more of the first through sixth aspects, the information associated with the first waveform or the second waveform, or the information associated with the condition, is a recommendation to be applied per panel or per group of panels.

In an eighth aspect, alone or in combination with one or more of the first through seventh aspects, the indication to switch from the first waveform to the second waveform indicates to switch from the first waveform to the second waveform after a time period.

In a ninth aspect, alone or in combination with one or more of the first through eighth aspects, the time period is configured in the UE or is received from the base station.

In a tenth aspect, alone or in combination with one or more of the first through ninth aspects, the time period is based at least in part on a capability of the UE.

In an eleventh aspect, alone or in combination with one or more of the first through tenth aspects, process 600 includes transmitting, to the base station, an indication that the UE has switched from the first waveform to the second waveform.

In a twelfth aspect, alone or in combination with one or more of the first through eleventh aspects, the second waveform includes a plurality of configurations, and the indication to switch from the first waveform to the second waveform indicates to switch to a particular configuration, of the plurality of configurations, of the second waveform.

In a thirteenth aspect, alone or in combination with one or more of the first through twelfth aspects, the first waveform is an OFDM waveform, a DFT spread OFDM waveform, or a single carrier frequency domain equalization (SC-FDE) waveform, and the second waveform is another of the OFDM waveform, the DFT spread OFDM waveform, or the SC-FDE waveform.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
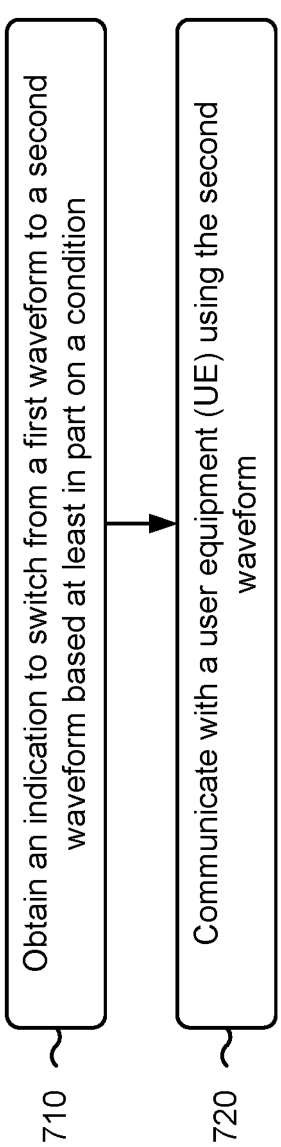
FIG. 7 is a diagram illustrating an example process associated with implicit waveform switching, in accordance with the present disclosure.

FIG. 7 is a diagram illustrating an example process 700 performed, for example, by a base station, in accordance with the present disclosure. Example process 700 is an example where the base station (e.g., base station 110) performs operations associated with implicit waveform switching.

As shown in FIG. 7, in some aspects, process 700 may include obtaining an indication to switch from a first waveform to a second waveform based at least in part on a condition (block 710). For example, the base station (e.g., using communication manager 150 and/or switching component 908, depicted in FIG. 9) may obtain an indication to switch from a first waveform to a second waveform based at least in part on a condition, as described above.

As further shown in FIG. 7, in some aspects, process 700 may include communicating with a UE using the second waveform (block 720). For example, the base station (e.g., using communication manager 150, reception component 902, and/or transmission component 904, depicted in FIG. 9) may communicate with a UE using the second waveform, as described above.

Process 700 may include additional aspects, such as any single aspect or any combination of aspects described below and/or in connection with one or more other processes described elsewhere herein.

In a first aspect, obtaining the indication to switch from the first waveform to the second waveform comprises determining, based at least in part on an occurrence of the condition, to switch from the first waveform to the second waveform.

In a second aspect, alone or in combination with the first aspect, obtaining the indication to switch from the first waveform to the second waveform comprises receiving, from the UE, based at least in part on an occurrence of the condition, a request for the base station to switch from the first waveform to the second waveform.

In a third aspect, alone or in combination with one or more of the first and second aspects, process 700 includes transmitting, to the UE, a configuration that includes the condition and one or more other conditions for switching from the first waveform to the second waveform.

In a fourth aspect, alone or in combination with one or more of the first through third aspects, the indication to switch from the first waveform to the second waveform indicates to use the second waveform for all symbols after an occurrence of the condition, in accordance with a pattern, for a time period, or some combination thereof.

In a fifth aspect, alone or in combination with one or more of the first through fourth aspects, process 700 includes receiving, from the UE, information associated with the first waveform or the second waveform, or information associated with the condition.

In a sixth aspect, alone or in combination with one or more of the first through fifth aspects, the information associated with the first waveform or the second waveform, or the information associated with the condition, is a recommendation to be applied per panel or per group of panels.

In a seventh aspect, alone or in combination with one or more of the first through sixth aspects, the indication to switch from the first waveform to the second waveform indicates to switch from the first waveform to the second waveform after a time period.

In an eighth aspect, alone or in combination with one or more of the first through seventh aspects, the time period is based at least in part on a capability of the UE.

In a ninth aspect, alone or in combination with one or more of the first through eighth aspects, process 700 includes receiving, from the UE, an indication that the UE has switched from the first waveform to the second waveform.

In a tenth aspect, alone or in combination with one or more of the first through ninth aspects, process 700 includes determining that the UE did not send an indication, within a time period, that the UE has switched from the first waveform to the second waveform, and switching from the second waveform to the first waveform for communicating with the UE.

In an eleventh aspect, alone or in combination with one or more of the first through tenth aspects, the second waveform includes a plurality of configurations, and the indication to switch from the first waveform to the second waveform indicates to switch to a particular configuration, of the plurality of configurations, of the second waveform.

In a twelfth aspect, alone or in combination with one or more of the first through eleventh aspects, the first waveform is an OFDM waveform, a DFT spread OFDM waveform, or an SC-FDE waveform, and the second waveform is another of the OFDM waveform, the DFT spread OFDM waveform, or the SC-FDE waveform.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
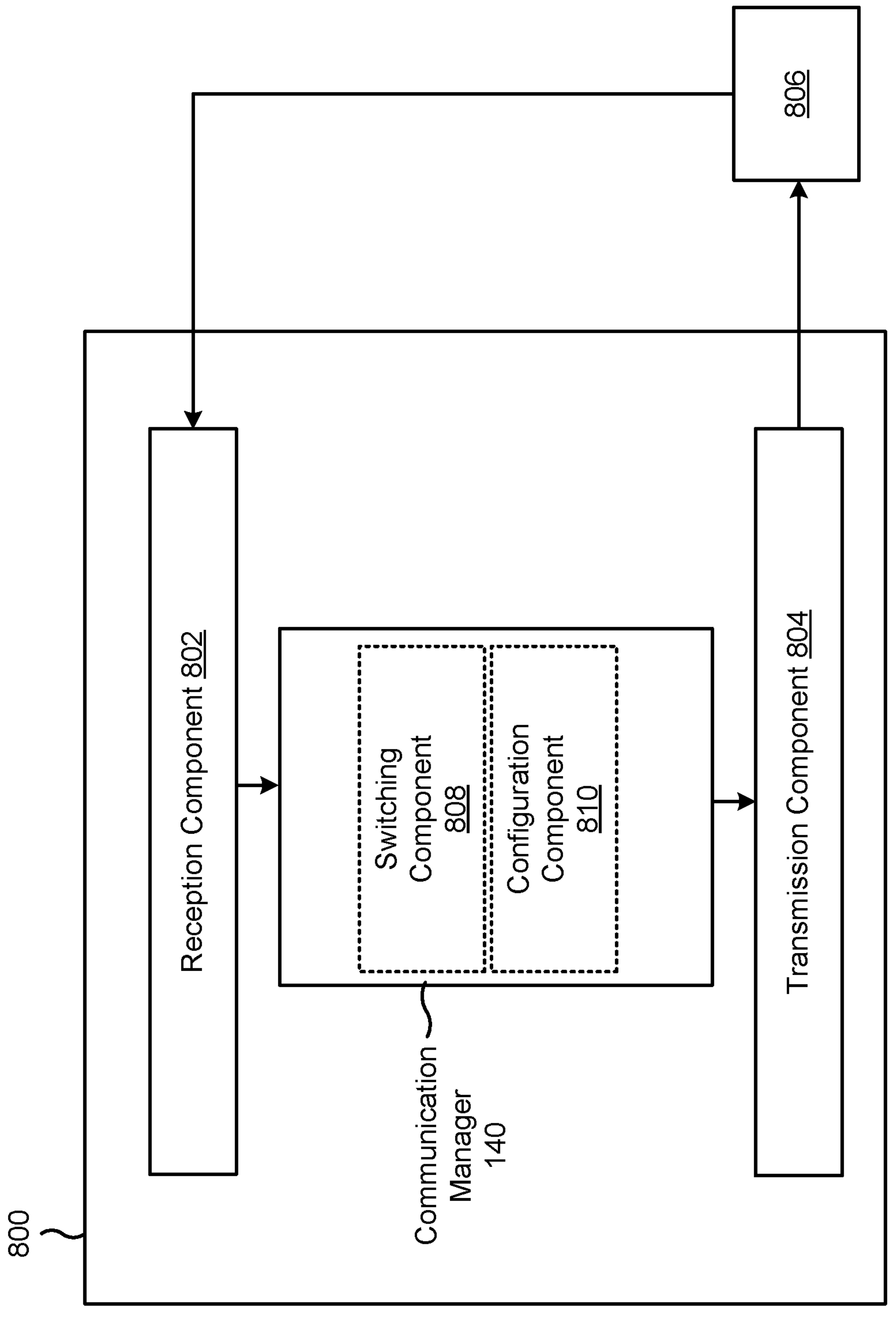
FIG. 8 is a diagram of an example apparatus for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a switching component 808, or a configuration component 810, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The switching component 808 may obtain an indication to switch from a first waveform to a second waveform based at least in part on a condition. The reception component 802 and/or the transmission component 804 may communicate with a base station using the second waveform.

The configuration component 808 may obtain, from a configuration of the UE, one or more conditions, including the condition, for switching from the first waveform to the second waveform.

The reception component 802 may receive, from the base station, one or more conditions, including the condition, for switching from the first waveform to the second waveform.

The transmission component 804 may transmit, to the base station, information associated with the first waveform or the second waveform, or information associated with the condition.

The transmission component 804 may transmit, to the base station, an indication that the UE has switched from the first waveform to the second waveform.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
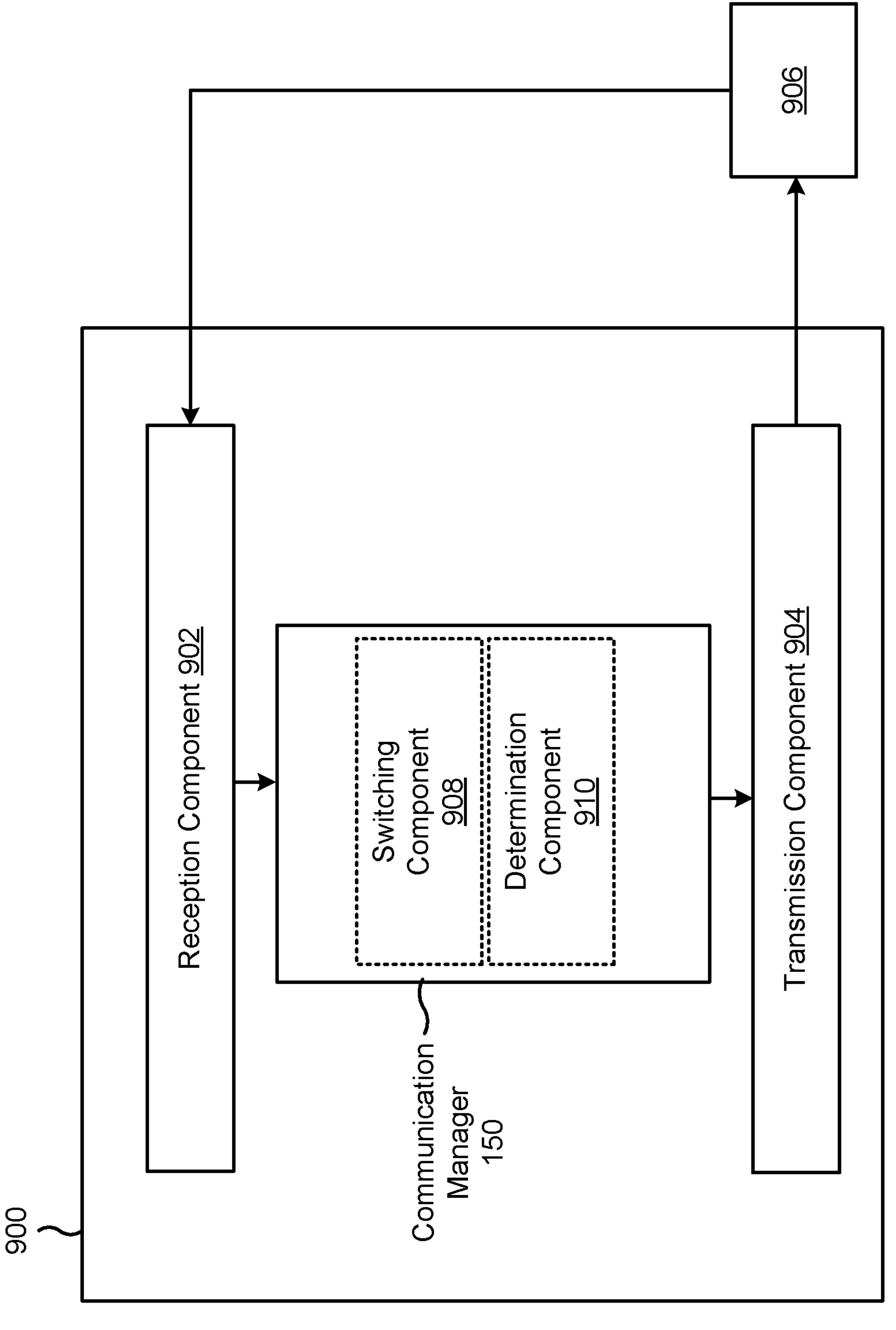
FIG. 9 is a diagram of an example apparatus for wireless communication, in accordance with the present disclosure.

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include one or more of a switching component 908, or a determination component 910, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The switching component 908 may obtain an indication to switch from a first waveform to a second waveform based at least in part on a condition. The reception component 902 and/or the transmission component 904 may communicate with a UE using the second waveform.

The transmission component 904 may transmit, to the UE, a configuration that includes the condition and one or more other conditions for switching from the first waveform to the second waveform.

The reception component 902 may receive, from the UE, information associated with the first waveform or the second waveform, or information associated with the condition.

The reception component 902 may receive, from the UE, an indication that the UE has switched from the first waveform to the second waveform.

The determination component 910 may determine that the UE did not send an indication, within a time period, that the UE has switched from the first waveform to the second waveform.

The switching component 908 may switch from the second waveform to the first waveform for communicating with the UE.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: obtaining an indication to switch from a first waveform to a second waveform based at least in part on a condition; and communicating with a base station using the second waveform.

Aspect 2: The method of Aspect 1, wherein obtaining the indication to switch from the first waveform to the second waveform comprises determining, based at least in part on an occurrence of the condition, to switch from the first waveform to the second waveform.

Aspect 3: The method of any of Aspects 1-2, wherein obtaining the indication to switch from the first waveform to the second waveform comprises receiving, from the base station, based at least in part on an occurrence of the condition, a request for the UE to switch from the first waveform to the second waveform.

Aspect 4: The method of any of Aspects 1-3, further comprising obtaining, from a configuration of the UE, one or more conditions, including the condition, for switching from the first waveform to the second waveform.

Aspect 5: The method of any of Aspects 1-4, further comprising receiving, from the base station, one or more conditions, including the condition, for switching from the first waveform to the second waveform.

Aspect 6: The method of any of Aspects 1-5, wherein the indication to switch from the first waveform to the second waveform indicates to use the second waveform for all symbols after an occurrence of the condition, in accordance with a pattern, for a time period, or some combination thereof.

Aspect 7: The method of any of Aspects 1-6, further comprising transmitting, to the base station, information associated with the first waveform or the second waveform, or information associated with the condition.

Aspect 8: The method of Aspect 7, wherein the information associated with the first waveform or the second waveform, or the information associated with the condition, is a recommendation to be applied per panel or per group of panels.

Aspect 9: The method of any of Aspects 1-8, wherein the indication to switch from the first waveform to the second waveform indicates to switch from the first waveform to the second waveform after a time period.

Aspect 10: The method of Aspect 9, wherein the time period is configured in the UE or is received from the base station.

Aspect 11: The method of Aspect 9, wherein the time period is based at least in part on a capability of the UE.

Aspect 12: The method of any of Aspects 1-11, further comprising transmitting, to the base station, an indication that the UE has switched from the first waveform to the second waveform.

Aspect 13: The method of any of Aspects 1-12, wherein the second waveform includes a plurality of configurations, and the indication to switch from the first waveform to the second waveform indicates to switch to a particular configuration, of the plurality of configurations, of the second waveform.

Aspect 14: The method of any of Aspects 1-13, wherein the first waveform is an orthogonal frequency division multiplexing (OFDM) waveform, a discrete Fourier transform (DFT) spread OFDM waveform, or a single carrier frequency domain equalization (SC-FDE) waveform, and the second waveform is another of the OFDM waveform, the DFT spread OFDM waveform, or the SC-FDE waveform.

Aspect 15: A method of wireless communication performed by a base station, comprising: obtaining an indication to switch from a first waveform to a second waveform based at least in part on a condition; and communicating with a user equipment (UE) using the second waveform.

Aspect 16: The method of Aspect 15, wherein obtaining the indication to switch from the first waveform to the second waveform comprises determining, based at least in part on an occurrence of the condition, to switch from the first waveform to the second waveform.

Aspect 17: The method of any of Aspects 15-16, wherein obtaining the indication to switch from the first waveform to the second waveform comprises receiving, from the UE, based at least in part on an occurrence of the condition, a request for the base station to switch from the first waveform to the second waveform.

Aspect 18: The method of any of Aspects 15-17, further comprising transmitting, to the UE, a configuration that includes the condition and one or more other conditions for switching from the first waveform to the second waveform.

Aspect 19: The method of any of Aspects 15-18, wherein the indication to switch from the first waveform to the second waveform indicates to use the second waveform for all symbols after an occurrence of the condition, in accordance with a pattern, for a time period, or some combination thereof.

Aspect 20: The method of any of Aspects 15-19, further comprising receiving, from the UE, information associated with the first waveform or the second waveform, or information associated with the condition.

Aspect 21: The method of Aspect 20, wherein the information associated with the first waveform or the second waveform, or the information associated with the condition, is a recommendation to be applied per panel or per group of panels.

Aspect 22: The method of any of Aspects 15-21, wherein the indication to switch from the first waveform to the second waveform indicates to switch from the first waveform to the second waveform after a time period.

Aspect 23: The method of Aspect 22, wherein the time period is based at least in part on a capability of the UE.

Aspect 24: The method of any of Aspects 15-23, further comprising receiving, from the UE, an indication that the UE has switched from the first waveform to the second waveform.

Aspect 25: The method of any of Aspects 15-24, further comprising: determining that the UE did not send an indication, within a time period, that the UE has switched from the first waveform to the second waveform; and switching from the second waveform to the first waveform for communicating with the UE.

Aspect 26: The method of any of Aspects 15-25, wherein the second waveform includes a plurality of configurations, and the indication to switch from the first waveform to the second waveform indicates to switch to a particular configuration, of the plurality of configurations, of the second waveform.

Aspect 27: The method of any of Aspects 15-26, wherein the first waveform is an orthogonal frequency division multiplexing (OFDM) waveform, a discrete Fourier transform (DFT) spread OFDM waveform, or a single carrier frequency domain equalization (SC-FDE) waveform, and the second waveform is another of the OFDM waveform, the DFT spread OFDM waveform, or the SC-FDE waveform.

Aspect 28: An apparatus for wireless communication at a device, comprising a processor; memory coupled with the processor; and instructions stored in the memory and executable by the processor to cause the apparatus to perform the method of one or more of Aspects 1-14.

Aspect 29: A device for wireless communication, comprising a memory and one or more processors coupled to the memory, the one or more processors configured to perform the method of one or more of Aspects 1-14.

Aspect 30: An apparatus for wireless communication, comprising at least one means for performing the method of one or more of Aspects 1-14.

Aspect 31: A non-transitory computer-readable medium storing code for wireless communication, the code comprising instructions executable by a processor to perform the method of one or more of Aspects 1-14.

Aspect 32: A non-transitory computer-readable medium storing a set of instructions for wireless communication, the set of instructions comprising one or more instructions that, when executed by one or more processors of a device, cause the device to perform the method of one or more of Aspects 1-14.

Aspect 33: An apparatus for wireless communication at a device, comprising a processor; memory coupled with the processor; and instructions stored in the memory and executable by the processor to cause the apparatus to perform the method of one or more of Aspects 15-27.

Aspect 34: A device for wireless communication, comprising a memory and one or more processors coupled to the memory, the one or more processors configured to perform the method of one or more of Aspects 15-27.

Aspect 35: An apparatus for wireless communication, comprising at least one means for performing the method of one or more of Aspects 15-27.

Aspect 36: A non-transitory computer-readable medium storing code for wireless communication, the code comprising instructions executable by a processor to perform the method of one or more of Aspects 15-27.

Aspect 37: A non-transitory computer-readable medium storing a set of instructions for wireless communication, the set of instructions comprising one or more instructions that, when executed by one or more processors of a device, cause the device to perform the method of one or more of Aspects 15-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
- one or more memories; and
- one or more processors, coupled to the one or more memories, configured to:
  - receive a configuration that includes one or more conditions for waveform switching;
  - perform a communication with a network entity using a first waveform;
  - detect an occurrence of a condition, of the one or more conditions, in the communication;
  - determine to switch from the first waveform to a second waveform based at least in part on the occurrence of the condition and without a transmission of a request to the network entity; and
  - communicate with the network entity using the second waveform.

2. The apparatus of claim 1, wherein the one or more processors are configured to receive, from the network entity, based at least in part on the occurrence of the condition, a request for the UE to switch from the first waveform to the second waveform.

3. The apparatus of claim 1, wherein the one or more processors are further configured to:
- obtain an indication to use the second waveform for all symbols after the occurrence of the condition, in accordance with a pattern, for a time period, or some combination thereof.

4. The apparatus of claim 1, wherein the one or more processors are further configured to transmit, to the network entity, information associated with the first waveform or the second waveform, or information associated with the condition.

5. The apparatus of claim 1, wherein the one or more processors are further configured to:
- obtain an indication to switch from the first waveform to the second waveform after a time period.

6. The apparatus of claim 1, wherein the one or more processors are further configured to transmit, to the network entity, an indication that the UE has switched from the first waveform to the second waveform.

7. The apparatus of claim 1, wherein the second waveform includes a plurality of configurations, and wherein the one or more processors are further configured to:
- obtain an indication to switch to a particular configuration, of the plurality of configurations, of the second waveform.

8. An apparatus for wireless communication at a network entity, comprising:
- one or more memories; and
- one or more processors, coupled to the one or more memories, configured to:
  - receive, from a user equipment (UE), information that includes one or more conditions for waveform switching;
  - perform a communication with the UE using a first waveform;
  - detect an occurrence of a condition, of the one or more conditions, in the communication;
  - transmit, to the UE, a request for the UE to switch from the first waveform to a second waveform based at least in part on the occurrence of the condition; and
  - communicate with the UE using the second waveform.

9. The apparatus of claim 8, wherein the one or more processors are configured to determine, based at least in part on the occurrence of the condition, to switch from the first waveform to the second waveform.

10. The apparatus of claim 8, wherein the one or more processors are further configured to transmit, to the UE, a configuration that includes the condition and one or more other conditions for switching from the first waveform to the second waveform.

11. The apparatus of claim 8, wherein the one or more processors are further configured to:

obtain an indication to use the second waveform for all symbols after the occurrence of the condition, in accordance with a pattern, for a time period, or some combination thereof.

12. The apparatus of claim 8, wherein the one or more processors are further configured to receive, from the UE, information associated with the first waveform or the second waveform, or information associated with the condition.

13. The apparatus of claim 8, wherein the one or more processors are further configured to:

obtain an indication to switch from the first waveform to the second waveform after a time period.

14. The apparatus of claim 8, wherein the one or more processors are further configured to receive, from the UE, an indication that the UE has switched from the first waveform to the second waveform.

15. The apparatus of claim 8, wherein the one or more processors are further configured to:

determine that the UE did not send an indication, within a time period, that the UE has switched from the first waveform to the second waveform; and switch from the second waveform to the first waveform for communicating with the UE.

16. The apparatus of claim 8, wherein the second waveform includes a plurality of configurations, and the one or more processors are further configured to:

obtain an indication to switch to a particular configuration, of the plurality of configurations, of the second waveform.

17. A method of wireless communication performed by a user equipment (UE), comprising:

receiving a configuration that includes one or more conditions for waveform switching;

performing a communication with a network entity using a first waveform;

detecting an occurrence of a condition, of the one or more conditions, in the communication;

determining to switch from the first waveform to a second waveform based at least in part on the occurrence of the condition and without a transmission of a request to the network entity; and communicating with the network entity using the second waveform.

18. The method of claim 17, further comprising:

receiving, from the network entity, based at least in part on the occurrence of the condition, a request for the UE to switch from the first waveform to the second waveform.

19. The method of claim 17, further comprising:

obtaining an indication to use the second waveform for all symbols after the occurrence of the condition, in accordance with a pattern, for a time period, or some combination thereof.

20. The method of claim 17, further comprising:

transmitting, to the network entity, information associated with the first waveform or the second waveform, or information associated with the condition.

21. The method of claim 17, further comprising:

obtaining an indication to switch from the first waveform to the second waveform after a time period.

22. The method of claim 17, further comprising:

transmitting, to the network entity, an indication that the UE has switched from the first waveform to the second waveform.

23. The method of claim 17, wherein the second waveform includes a plurality of configurations, and wherein the method further comprises:

obtaining an indication to switch to a particular configuration, of the plurality of configurations, of the second waveform.

24. A method of wireless communication performed by a network entity, comprising:

receiving, from a user equipment (UE), information that includes one or more conditions for waveform switching;

performing a communication with the UE using a first waveform;

detecting an occurrence of a condition, of the one or more conditions, in the communication;

transmitting, to the UE, a request for the UE to switch from the first waveform to a second waveform based at least in part on the occurrence of the condition; and communicating with the UE using the second waveform.

25. The method of claim 24, further comprising:

determining, based at least in part on the occurrence of the condition, to switch from the first waveform to the second waveform.

26. The method of claim 24, further comprising transmitting, to the UE, a configuration that includes the condition and one or more other conditions for switching from the first waveform to the second waveform.

27. The method of claim 24, further comprising:

obtaining an indication to use the second waveform for all symbols after the occurrence of the condition, in accordance with a pattern, for a time period, or some combination thereof.

28. The method of claim 24, further comprising:

receiving, from the UE, information associated with the first waveform or the second waveform, or information associated with the condition.

29. The method of claim 24, further comprising:

obtaining an indication to switch from the first waveform to the second waveform after a time period.

30. The method of claim 24, further comprising:

receiving, from the UE, an indication that the UE has switched from the first waveform to the second waveform.

* * * * *